(12) United States Patent
Koenig-Grillo et al.

(10) Patent No.: US 9,445,621 B2
(45) Date of Patent: Sep. 20, 2016

(54) JUICE OR NECTAR FORMULATIONS

(75) Inventors: Simone Koenig-Grillo, Neuenburg am Rheim (DE); Neil MacFarlane, Augst (CH); Thomas Lindemann, Bad Saeckingen (DE); Karl Manfred Voelker, Freiburg (DE)

(73) Assignee: DSM IP ASSETS B.V., Heerlen (NL)

( * ) Notice: Subject to any disclaimer, the term of this patent is extended or adjusted under 35 U.S.C. 154(b) by 605 days.

(21) Appl. No.: 13/390,943

(22) PCT Filed: Sep. 3, 2010

(86) PCT No.: PCT/EP2010/062962
§ 371 (c)(1),
(2), (4) Date: Sep. 5, 2012

(87) PCT Pub. No.: WO2011/026941
PCT Pub. Date: Mar. 10, 2011

(65) Prior Publication Data
US 2013/0004641 A1    Jan. 3, 2013

(30) Foreign Application Priority Data
Sep. 4, 2009  (CH) ..................... 1398/09

(51) Int. Cl.
| | | |
|---|---|---|
| A23L 2/00 | (2006.01) | |
| C11B 5/00 | (2006.01) | |
| A23L 2/02 | (2006.01) | |
| A23L 1/30 | (2006.01) | |
| A23L 2/52 | (2006.01) | |
| A23L 2/68 | (2006.01) | |

(52) U.S. Cl.
CPC ............... *A23L 2/02* (2013.01); *A23L 1/3008* (2013.01); *A23L 2/52* (2013.01); *A23L 2/68* (2013.01); *A23V 2002/00* (2013.01); *C11B 5/00* (2013.01); *C11B 5/0021* (2013.01)

(58) Field of Classification Search
CPC .......... A23L 1/3008; A23L 2/02; A23L 2/52; A23L 2/68; A23V 2002/00; A23V 2200/16; A23V 2250/1882; A23V 2250/211; C11B 5/00; C11B 5/0021
USPC ........ 426/541, 542, 544, 546, 590, 599, 601
See application file for complete search history.

(56) References Cited

U.S. PATENT DOCUMENTS

| | | |
|---|---|---|
| 2003/0082275 A1 | 5/2003 | Myhre |
| 2006/0121159 A1 | 6/2006 | Myhre |
| 2006/0280776 A1* | 12/2006 | Koide ..................... 424/439 |
| 2008/0058417 A1 | 3/2008 | Abril et al. |
| 2009/0162524 A1 | 6/2009 | Rivera et al. |

FOREIGN PATENT DOCUMENTS

| | | |
|---|---|---|
| EP | 0 659 347 | 6/1995 |
| EP | 0 755 634 | 1/1997 |
| WO | WO 2009/071285 | * 6/2009 |

OTHER PUBLICATIONS

International Search Report for PCT/EP2010/062962, mailed Nov. 29, 2010.

* cited by examiner

*Primary Examiner* — Leslie Wong
(74) *Attorney, Agent, or Firm* — Nixon & Vanderhye P.C.

(57) ABSTRACT

The present invention relates to (fruit) juices and nectars formulations, comprising (LC)-PUFA's, which do not have the characteristic fish taste of the (long chain) polyunsaturated fatty acids. Furthermore, the present invention also relates to a base material, which comprises PUFA and β-carotene and the use of such a base material to produce a (fruit) juice or (fruit) nectar formulation.

12 Claims, No Drawings

JUICE OR NECTAR FORMULATIONS

This application is the U.S. national phase of International Application No. PCT/EP2010/062962 filed 3 Sep. 2010 which designated the U.S. and claims priority to CH 01398/09 filed 4 Sep. 2009, the entire contents of each of which are hereby incorporated by reference.

FIELD

The present invention relates to (fruit) juices and nectars formulations, comprising (LC)-PUFA's which do not have the characteristic fish taste of the (long chain) polyunsaturated fatty acids. Furthermore, the present invention also relates to a base material, which comprises PUFA and β-carotene and the use of such a base material to produce a (fruit) juice or (fruit) nectar formulation.

BACKGROUND AND SUMMARY

Because of the benefits related to the human and animal health it is desirable to add (LC)-PUFA's to food and feed products. Juices and nectars are regarded as very healthy products. They contain some ingredients, such as vitamins and fibres, which are good for a healthy diet. The addition of PUFA's, which are usually compounds from a natural source, to juice or nectar formulations results in formulation with some additional and very interesting benefits for the consumers. But a major negative issue in regard to the addition of (LC)-PUFA's to a juice or nectar formulation, is the smell and taste of these compounds. A reasonable amount of PUFA's should be added to a juice or nectar and therefore a strong fish taste can be detected. Such a taste is not acceptable for most people. This negative effect is even bigger when the juice or nectar formulation is bottled in transparent glass or PET bottles.

Therefore, the goal of the present invention was to find a (fruit) juice of (fruit) nectar formulation, which comprises (next to the juice or nectar, which is the main component) at least one (LC)-PUFA, but which has no (or just a little) fishy taste. The juice or nectar formulation should not taste or smell fishy for a period, which is at least as long as a typical shelf life of such a formulation.

Surprisingly, it was found that a good tasting (=not fishy) PUFA comprising (fruit) juice or (fruit) nectar formulation could be produced by adding β-carotene to the formulation. The stabilization by addition of β-carotene is especially important, when a juice or nectar is bottled in transparent glass or PET bottles, because β-carotene protects against photo-oxidation, as it acts as singlet-oxygen quencher.

Therefore the present invention relates to a juice or nectar formulation comprising
(i) juice or nectar, and
(ii) 100 ppm 1000 ppm of at least one LC-PUFA, and
(iii) 0.1 ppm-20 ppm of β-carotene.

DETAILED DESCRIPTION

The term "juice formulation" means that the basis of the composition is juice and that some other ingredients are added to the "pure" juice. By the term "juice" in the context of the present invention it is meant a liquid naturally contained in fruit or vegetable tissue. Juice is usually prepared by mechanically squeezing or macerating fresh fruits or vegetables without the application of heat or solvents. Many commercial juices are filtered to remove fibre or pulp, but high pulp fresh orange juice is a popular beverage. Juice can be in concentrate form, sometimes frozen, requiring to add water to reconstitute the liquid back to its "original state". Common methods for preservation and processing of fruit juices include canning, pasteurization, freezing, evaporation and spray drying. Popular juices include, but are not limited to, apple, orange, grapefruit, pineapple, tomato, passion fruit, mango, carrot, grape, cherry, cranberry and pomegranate.

Most nations define a standard purity for a beverage to be considered a "fruit juice." This name is commonly reserved for beverages that are 100% pure fruit juice. In the EU juices and nectars are regulated by a council directive (EU Council Directive 2001/112/EC of 20 Dec. 2001).

Juice itself is not a carbonated beverage, but some carbonated beverages, such as for example Orangina®, are sold with actual fruit juice as an ingredient.

By the term "nectar" in the context of the present invention it is meant a type of non-carbonated soft drink made with fruit juice. In some countries, the beverage industry distinguishes nectars from drinks labelled as "juice". In the United States and the United Kingdom, the term "fruit juice" is restricted to beverages that are 100% pure juice, whereas "nectar" may contain additives besides fruit juice, including sweeteners and preservatives.

Preferred embodiments of the present invention are juices and nectars which are fruit juices and fruit nectars. Very preferred embodiments of the present invention comprise fruit juice or fruit nectars made from oranges.

In the context of the present invention the terms "PUFA" (Polyunsaturated fatty acid) and "LC-PUFA" (Long Chain Polyunsaturated fatty acid) are used in their generally accepted meanings; it relates to fatty acids with at least 2 carbon-carbon double bonds (preferably 2 to 6, more preferably 4 or 5 or 6 carbon-carbon double bonds), preferably consisting of 16-24 carbon atoms (preferably 18-22 carbon atoms), and comprise n-3, n-6 and n-9 acids. Although the term PUFA defines free acids it is generally understood to also mean their salts and these acids in the form of their naturally occurring esters, i.e. as glycerides (comprising mono-, di- and triglycerides) and in form of esters into which they are converted, e.g. by transesterification, such as ethyl esters. PUFA's of preferred interest in the context of the present invention are n-3 and n-6 PUFA's, especially EPA (eicosapenta-5,8,11,14,17-enoic acid), DPA (docosapentaenoic acid), DHA (docosahexa-4,7,10,13,16,19-enoic acid), GLA (γ-linolenic acid) and ARA (arachidonic acid), preferably of food-grade quality, as single compounds or in mixtures, preferably in the form of their esters, e.g., triglycerides, or ethyl esters, especially as components of oils obtained from marine animals, preferably from fish, from plants or by fermentation.

Fatty acids are also classified based on the length of the carbon chain. Short chain fatty acids have 2 to about 6 carbons. Medium chain fatty acids have from about 6 to about 14 carbons. Long chain fatty acids have from 16 to 24 or more carbons. Long chain PUFAs (LC-PUFAs) having 20 or more carbons are of particular interest in the present invention.

PUFA's can be stabilized and/or deodorized by methods known in the art, e.g., by addition of antioxidants, emulsifiers, spices or herbs, such as rosemary or sage extracts. In a preferred embodiment of the present invention the term PUFA refers to refined fish oils commercially available and known under the trade mark ROPUFA® (from DSM Nutritional Products Ltd, Kaiseraugst, Switzerland). In a further preferred embodiment of the present invention the ROPUFA® has been stabilized with tocopherols or tocotrienols (natural mixtures or synthetically prepared, preferably a-tocopherol), if desired together with other antioxidants and/or deodorants, such as ascorbyl palmitate and/or rosemary extract.

Preferred derivatives of the polyunsaturated fatty acids are their esters, for example glycerides and, in particular, triglycerides and the ethyl esters. Triglycerides of n-3 polyunsaturated fatty acids are especially preferred. The triglycerides can contain 3 uniform unsaturated fatty acids or 2 or 3 different unsaturated fatty acids. It also covers the mixture of such compounds. Furthermore, they may also partly contain saturated fatty acids.

When the derivatives are triglycerides, normally three different n-3 polyunsaturated fatty acids are esterified with glycerol. In one preferred embodiment of the present invention triglycerides are used, whereby 30% of the fatty acid parts are n-3 fatty acids and of these 25% are long-chain polyunsaturated fatty acids. Commercially available RO-PUFA® '30' n-3 Food Oil is preferably used to prepare emulsions according to the present invention. Commercially available ROPUFA® '75' n-3 EE can also be used for the preparation of emulsions according to the present invention. ROPUFA® '75' n-3 EE is refined marine oil in form of an ethyl ester with minimum content of 72% n-3 fatty acid ethyl ester. It is stabilized with mixed tocopherols, ascorbyl palmitate, and citric acid and contains rosemary extract.

It is also possible to use naturally occurring oils (one ore more components) containing triglycerides of polyunsaturated fatty acids, for example marine oils (fish oils) and/or plant oils. Oils which comprise triglycerides of polyunsaturated fatty acids are olive oil, sunflower seed oil, evening primrose seed oil, borage oil, grape seed oil, soybean oil, groundnut oil, wheat germ oil, pumpkin seed oil, walnut oil, sesame seed oil, rapeseed oil (canola), blackcurrant seed oil, kiwifruit seed oil, oil from specific fungi and fish oils.

To obtain a juice or a nectar which can be consummated by human beings and/or animals, the PUFA compounds should be food grade.

A preferred embodiment of the present invention is a fruit juice formulation comprising 150 ppm-800 ppm of at least one LC-PUFA, more preferably 150 ppm-600 ppm, especially preferably 200 ppm-400 ppm. Ppm (part per million) denotes one part per 1,000,000 parts (one part in 106, and a value of 1×10–6).

β-carotene belongs to a family of natural chemicals known as carotenes which are widely found in plants, fruits and vegetables which are orange red in colour. The IUPAC name for β-carotene is 3,7,12,16-tetramethyl-1,18-bis(2,6,6-trimethyl-1-cyclohexenyl)-octadeca-1,3,5,7,9,11,13,15,17-nonaene (molecular formula C40H56).

A preferred embodiment of the present invention relates to juice or nectar formulations comprising 0.3 ppm-10 ppm of β-carotene, more preferably 0.5 ppm-5 ppm, especially preferably 0.5 ppm-1 ppm.

A (fruit) juice or (fruit) nectar formulation according to the present invention can also comprise further ingredients which are commonly used in beverages for human beings or animals. Examples of such ingredients are water (or other additional liquid), vitamins, sugar (or any kind of artificial or natural sweetener), flavour (artificial or natural), colouring agents (artificial or natural), thickeners, fibres, etc. These ingredients can be added in amounts which are common in the field of beverage making. It is preferred that all these ingredients are food grade or are allowable in food or feed products.

The (fruit) juice or (fruit) nectar formulations according to the present invention can be in a "ready-to-use" form. This means that the beverage can be consummated without any further processing (such as for example diluting). But it is also possible to provide (fruit) juice or nectar compositions in form, which must be further processed before consumption. A very common form, is a concentrated form, which can be diluted either by the consumer just before the consumption or by a producer of the end product before filling into the containers.

A further embodiment of the present invention is a "base material", which can be added to the (fruit) juice or (fruit) nectar to obtain a (fruit) juice or (fruit) nectar formulation as described above.

Therefore, the present invention also provides a composition comprising
(a) at least one PUFA and
(b) β-carotene.

Therefore, the present invention also provides a preferred base composition comprising:
(a) 99.9-99.99 wt-%, based on the total weight of the base composition, of at least one PUFA and
(b) 0.01-0.1 wt-%, based on the total weight of the base composition, of β-carotene.

A further embodiment of the present invention is the use of a base composition comprising:
(a) 99.9-99.99 wt-%, based on the total weight of the base composition, of at least one PUFA and
(b) 0.01-0.1 wt-%, based on the total weight of the base composition, of β-carotene, to produce a juice or a nectar.

The production of a juice or nectar according to the present invention can be done according to processes well known in the field of juice and nectar formulations. The base formulation according to the present invention is diluted so much that the amount of PUFA and/or β-carotene as disclosed above is obtained. Usually the base material is diluted at least 100 times.

The following examples serve to illustrate the invention.

EXAMPLES

General

The juices of the present invention are tested by using a Sniff Test. The samples of all the juices of the following examples are given to a trained and experienced taste panel. The sensory analysis is performed by means of descriptive analysis by using interval scales in terms of different attributes. The interval scale consists of 7 interval, starting with 1 for attribute "not detectable" up to 7 for "extremely intense".

As a juice the following orange juice has been used for all the examples:

TABLE 1

| Orange juice | |
|---|---|
| Ingredients | wt-% |
| Orange juice concentrate 60° Brix | 78.10 |
| Orange oil (flavour) | 0.06 |
| Ascorbic acid | 0.20 |
| Water | 21.64 |

In the tables 2 and 3 the base materials for the production of the orange juice formulations are listed. The values in the columns are given in wt-% (based on the total weight of the base material).

TABLE 2

Base materials of Examples 1 to 3

| Ingredients | Exp. 1 [wt-%] | Exp. 2 [wt-%] | Exp. 3 [wt-%] |
|---|---|---|---|
| ROPUFA '30' n-3 Food Oil (from DSM) | 33 | 33 | 33 |
| β-carotene* (β-carotene10% EM Red, from DSM) | 0.03 | — | — |
| β-carotene* (β-carotene10% CWS/S, from DSM) | — | 0.03 | — |
| β-carotene* (β-carotene30% EM Red, from DSM) | — | — | 0.03 |
| Gum Acacia | 19 | 19 | 19 |
| Glycerol | 15 | 15 | 15 |
| NaAscorbate | 3 | 3 | 3 |
| Maltodextrin MD2023 (from Roquette) | 10 | 10 | 10 |
| Water (total) | 19.97 | 19.97 | 19.97 |

*The total β-carotene content of the base materials is given. Used are various commercially available β-carotenes (from DSM) for the preparation of these examples.

TABLE 3

Base materials of Examples 4 to 6

| Ingredients | Exp. 4 [wt-%] | Exp. 5 [wt-%] | Exp. 6 (comparative) [wt-%] |
|---|---|---|---|
| ROPUFA '30' n-3 Food Oil (from DSM) | 33 | 42 | 33 |
| β-carotene* (β-carotene10% CWS, from DSM) | 0.03 | — | 0 |
| β-carotene* (β-carotene10% EM Red, from DSM) | — | 0.03 | 0 |
| β-carotene* | — | — | 0 |
| Gum Acacia | 19 | — | 19 |
| Lecithin Emulfluid NGM (from Cargill) | — | 7.5 | — |
| Ryoto Sugar Ester P1670 (from Mitsubishi) | — | 7.5 | — |
| Glycerol | 15 | 15 | 15 |
| NaAscorbate | 3 | 3 | 3 |
| Maltodextrin MD2023 (from Roquette) | 10 | 5 | 10 |
| Water (total) | 19.97 | 19.97 | 20 |

*The total β-carotene content of the base materials is given. Used are various commercially available β-carotenes (from DSM) for the preparation of these examples.

The Preparation of the Base Materials of Examples 1-4 and 6

The preparation is carried out under N2-atmosphere. The gum acacia and the glycerol are mixed in a reaction vessel. Water is added and the gum acacia is dissolved under stirring (500 rpm) at 65° C. (30 min). The solution is the cooled down to 40° C. and sodium ascorbate dissolved in water is added to the mixture. The ROPUFA '30' n-3 Food Oil is and the β-carotene (examples 1-4) are emulsified into the aqueous matrix under stirring with a micer disc (4800 rpm, 40° C.).

The Preparation of the Base Materials of Example 5

The preparation is carried out under N2-atmosphere. The gum acacia and the glycerol are mixed in a reaction vessel. Water is added and the gum acacia is dissolved under stirring (500 rpm) at 65° C. (30 min). The solution is the cooled down to 40° C. and sodium ascorbate dissolved in water is added to the mixture. The ROPUFA '30' n-3 Food Oil is and the β-carotene are emulsified into the aqueous matrix under stirring with a micer disc (4800 rpm, 40° C.) and afterwards high pressure homogenization (2 passes 300/150 bar) is applied.

All the base materials (of Tables 2 and 3) were diluted with the orange juice (Table 1) so that the β-carotene content was 0.9 ppm in each of the orange juice formulations. These orange juice formulations are tested by using the above described Sniff Test. All formulations are tested immediately after the production (no storage) and then after the storage (at 25° C.) after 1, 2 and 3 months.

The results are summarised in the following tables 4 and 5:

TABLE 4

Sniff Test results of orange juice formulations of Exp 1-3

| | Exp. 1 | Exp. 2 | Exp. 3 | Exp. 4 |
|---|---|---|---|---|
| No storage | 1.0 | 1.1 | 1.0 | 1.2 |
| 1 month | 1.5 | 1.3 | 1.6 | 1.4 |
| 2 months | 1.0 | 1.8 | 1.4 | 1.5 |
| 3 months | 1.1 | 1.3 | 1.2 | 1.2 |

TABLE 5

Sniff test results of orange juice formulations of Exp 5 and 6 and the "pure orange juice

| | Exp. 5 | Exp. 6 (comparative) | Orange Juice |
|---|---|---|---|
| No storage | 1.3 | 1.5 | 1.08 |
| 1 month | 1.3 | 4.1 | 1.08 |
| 2 months | 1.3 | 3.6 | 1 |
| 3 months | 1.5 | 3.1 | 1 |

It can be seen that the values of Example 6, which contains no β-carotene is significantly higher (especially after storage). It can be seen that the addition of a small amount of β-carotene results surprisingly in formulation, which have no (strong) fishy taste.

The invention claimed is:

1. A juice or nectar formulation comprising:
   (i) juice or nectar,
   (ii) an amount between 100 ppm-1000 ppm of at least one long chain polyunsaturated fatty acid (LC-PUFA) having a chain length of 20 or more carbon atoms, and
   (iii) an effective amount of 0.01 ppm-20 ppm of β-carotene to suppress detectable fish taste in the formulation attributable to the amount of the LC-PUFA in the formulation after storage for at least one month at 25° C.

2. The formulation according to claim 1, wherein the juice is a fruit juice.

3. The formulation according to claim 1, wherein the nectar is a fruit nectar.

4. The formulation according to claim 1, wherein the formulation comprises 150 ppm-800 ppm of the at least one LC-PUFA.

5. The formulation according to claim 4, comprising 150 ppm-600 ppm of the at least one LC-PUFA.

6. The formulation according to claim 4, comprising 200 ppm-400 ppm of the at least one LC-PUFA.

7. The formulation according to claim 1, comprising 0.3 ppm -10 ppm of the β-carotene.

8. The formulation according to claim 7, comprising 0.5 ppm -5 ppm of the β-carotene.

9. The formulation according to claim 7, comprising 0.5 ppm -1 ppm of the β-carotene.

10. The formulation according to claim 4, wherein the LC-PUFA comprises fatty acids with at least 2 carbon-carbon double bonds and consisting of 20 to 24 carbon atoms.

11. The formulation according to claim 4, wherein the LC-PUFA is at least one selected from the group consisting of eicosapenta- 5,8,11,14,17-enoic acid (EPA), docosapentaenoic acid (DPA), docosahexa- 4,7,10,13,16,19-enoic acid (DHA), γ-linolenic acid (GLA) and arachidonic acid (ARA).

12. A method of making a juice or a nectar formulation according to claim 1, comprising:
   (a) introducing into a juice or nectar a base composition comprised of 99.9-99.99wt-%, based on the total weight of the base composition, of at least one long chain polyunsaturated fatty acid (LC-PUFA) having a chain length of 20 or more carbon atoms, and
   (b) suppressing detectable fish taste in the juice or nectar formulation attributable to the amount of the LC-PUFA therein after storage for at least one month at 25° C. by introducing into the juice or nectar an effective amount of 0.01-0.1wt-% of β-carotene, based on the total weight of the base composition and β-carotene, to suppress the detectable fish taste in the juice or nectar formulation attributable to the amount of the LC-PUFA in the formulation after storage for at least one month at 25° C.

* * * * *